(12) United States Patent
Jiang-Häfner et al.

(10) Patent No.: US 8,767,422 B2
(45) Date of Patent: Jul. 1, 2014

(54) INTERFACE ARRANGEMENT BETWEEN AC AND DC SYSTEMS USING GROUNDING SWITCH

(75) Inventors: Ying Jiang-Häfner, Ludvika (SE); Baoliang Sheng, Ludvika (SE)

(73) Assignee: ABB Technology AG, Zurich (CH)

( * ) Notice: Subject to any disclaimer, the term of this patent is extended or adjusted under 35 U.S.C. 154(b) by 47 days.

(21) Appl. No.: 13/698,530

(22) PCT Filed: Jun. 1, 2010

(86) PCT No.: PCT/EP2010/057605
§ 371 (c)(1),
(2), (4) Date: Nov. 16, 2012

(87) PCT Pub. No.: WO2011/150963
PCT Pub. Date: Dec. 8, 2011

(65) Prior Publication Data
US 2013/0063989 A1   Mar. 14, 2013

(51) Int. Cl.
*H02H 7/00*   (2006.01)
(52) U.S. Cl.
USPC .......................................................... 363/51
(58) Field of Classification Search
USPC ........... 363/35, 39–47, 50–52; 307/38, 39, 69
See application file for complete search history.

(56) References Cited

U.S. PATENT DOCUMENTS

| | | | | |
|---|---|---|---|---|
| 4,059,843 A * | 11/1977 | Girismen | | 361/102 |
| 4,689,733 A | 8/1987 | Guth et al. | | |
| 5,343,461 A * | 8/1994 | Barton et al. | | 370/249 |
| 6,118,678 A * | 9/2000 | Limpaecher et al. | | 363/60 |
| 6,538,343 B1 * | 3/2003 | Stewart | | 307/38 |
| 6,577,487 B2 * | 6/2003 | Gertmar | | 361/113 |
| 7,190,085 B2 | 3/2007 | Moehlenkamp | | |
| 7,531,915 B2 * | 5/2009 | Wang et al. | | 307/57 |
| 7,557,464 B2 * | 7/2009 | Wang et al. | | 307/65 |
| 7,656,059 B2 * | 2/2010 | Wang et al. | | 307/82 |
| 7,659,700 B2 * | 2/2010 | Holveck et al. | | 323/214 |

(Continued)

FOREIGN PATENT DOCUMENTS

| | | |
|---|---|---|
| DE | 1 588 457 | 2/1971 |
| EP | 0 166 954 A1 | 1/1986 |
| EP | 0 552 002 A1 | 7/1993 |
| GB | 2 397 445 A | 7/2004 |

OTHER PUBLICATIONS

Steimer et al., "IGCT—a New Emerging Technology for High Power, Low Cost Inverters", IEE Industry Applications Society, Oct. 5-9, 1997, pp. 1592-1599.

*Primary Examiner* — Adolf Berhane
(74) *Attorney, Agent, or Firm* — Birch, Stewart, Kolasch & Birch, LLP (57) ABSTRACT

An interface arrangement for connection between an AC system and a DC system and to a method of disconnecting a DC system from an AC system are disclosed. The arrangement includes a converter for conversion between AC and DC having a DC side for connection to the DC system and an AC side for being coupled to the AC system, a set of circuit breakers coupled between the AC side of the converter and the AC system and a breaker assisting unit including a set of branches connected between the AC side of the converter and ground, where each branch includes a switch in series with an impedance element.

20 Claims, 4 Drawing Sheets

(56) References Cited

U.S. PATENT DOCUMENTS

| | | | |
|---|---|---|---|
| 8,373,307 B2 * | 2/2013 | Sihler et al. | 307/69 |
| 8,436,490 B2 * | 5/2013 | Gertmar et al. | 307/100 |
| 8,482,158 B2 * | 7/2013 | Kurs et al. | 307/104 |
| 2008/0007973 A1 | 1/2008 | Schreiber | |
| 2008/0084643 A1 | 4/2008 | Flottemesch et al. | |
| 2008/0284249 A1 | 11/2008 | Datta et al. | |
| 2009/0225570 A1 | 9/2009 | Pereira et al. | |
| 2011/0090726 A1 * | 4/2011 | Brotto et al. | 363/131 |
| 2013/0070491 A1 * | 3/2013 | Jiang-Hafner et al. | 363/41 |
| 2013/0200859 A1 * | 8/2013 | Jiang-Hafner et al. | 320/166 |

* cited by examiner

INTERFACE ARRANGEMENT BETWEEN AC AND DC SYSTEMS USING GROUNDING SWITCH

FIELD OF THE INVENTION

The present invention generally relates to power transmission systems. More particularly the present invention relates to an interface arrangement for connection between an AC system and a DC system and a method of disconnecting a DC system from an AC system.

BACKGROUND

Interface arrangements are known to be connected between an Alternating Current (AC) system, often denoted AC grid and a Direct Current (DC) system, like a High Voltage Direct Current (HVDC) system. Such an arrangement typically includes a converter, such as a voltage source converter, for conversion between AC and DC and having a DC side connected to the DC system and an AC side for coupling to the AC system.

For safety reasons an interface arrangement is often connected between two such systems via circuit breakers. This type of connection is for instance shown in US 2008/0084643.

If faults occur in such a DC system or in the interface arrangement, it is of interest to open the DC system from the AC system. This is normally done through opening the circuit breakers. This opening can normally not be performed immediately when the fault occurs, because the current has to be alternating with zero-crossings.

These faults also put a lot of stress on the electronic components used in the converter, like overvoltage and fault current stress. It is therefore of interest to limit this stress applied on the components of the converter caused by a fault.

SUMMARY OF THE INVENTION

The present invention addresses this situation. The invention is thus directed towards limiting the stress applied on a converter at the occurrence of a fault.

This objective is according to one aspect of the invention achieved through an interface arrangement for connection between an AC system and a DC system and comprising a converter for conversion between AC and DC, the converter having a DC side for connection to the DC system and an AC side for being coupled to the AC system, a set of circuit breakers coupled between the AC side of the converter and the AC system, and a breaker assisting unit comprising a set of branches connected between the AC side of the converter and ground, where each branch includes a switch in series with an impedance element.

The objective is also achieved by a method of disconnecting a DC system from an AC system, where the DC system is coupled to the AC system via a converter for conversion between AC and DC and a set of circuit breakers and to ground via a breaker assisting unit comprising a set of branches, where each branch includes a switch in series with an impedance element, wherein the circuit breakers are closed and the switches are open in normal operation, the method comprising the steps of:

obtaining an indication of a fault, closing the switches of the branches based on the indication for ensuring zero-crossings in currents flowing through the circuit breakers, and opening the circuit breakers at such zero-crossings.

The expression "coupled" used is intended to cover the possibility of an indirect electrical connection between two elements. There may thus be one or more elements placed between two elements defined as being coupled to each other. The expression "connected" is on the other hand intended to mean a direct electrical connection of two entities to each other without any entity between them.

The invention has a number of advantages. The switches of the breaker assisting unit are quickly closed when a fault takes place and thereby the converter is protected against stresses such as overvoltage stresses and fault current stresses. The closing also ensures the existence of zero crossings of the fault currents for ensuring a safer opening of the circuit breakers.

BRIEF DESCRIPTION OF THE DRAWINGS

The present invention will in the following be described with reference being made to the accompanying drawings, where FIG. 1 schematically shows a DC system being coupled to an AC system via an interface arrangement according to the invention, FIG. 2A schematically shows the structure of a filter provided in the interface arrangement, FIG. 2B schematically shows the structure of a breaker assisting unit provided in the interface arrangement, FIG. 3 schematically shows a first type of converter that can be used in the interface arrangement, FIG. 4 schematically shows a second type of converter that can be used in the interface arrangement, FIG. 5 schematically shows a first variation of a third type of converter that can be used in the interface arrangement, FIG. 6 schematically shows a second variation of the third type of converter that can be used in the interface arrangement, FIG. 7 schematically shows a third variation of the third type of converter that can be used in the interface arrangement.

DETAILED DESCRIPTION OF THE INVENTION

In the following, embodiments of the invention will be described.

The present invention is directed towards providing an arrangement for interfacing a Direct Current (DC) system with an Alternating Current (AC) system, which systems may both be power transmission systems. The DC system can for instance be a High Voltage Direct Current (HVDC) power transmission system and the AC system may be a Flexible Alternating Current Transmission System (FACTS). However these systems are mere examples of such systems and should not be considered as a requirement. The invention can also be applied in for instance power distribution systems.

Figure 1:
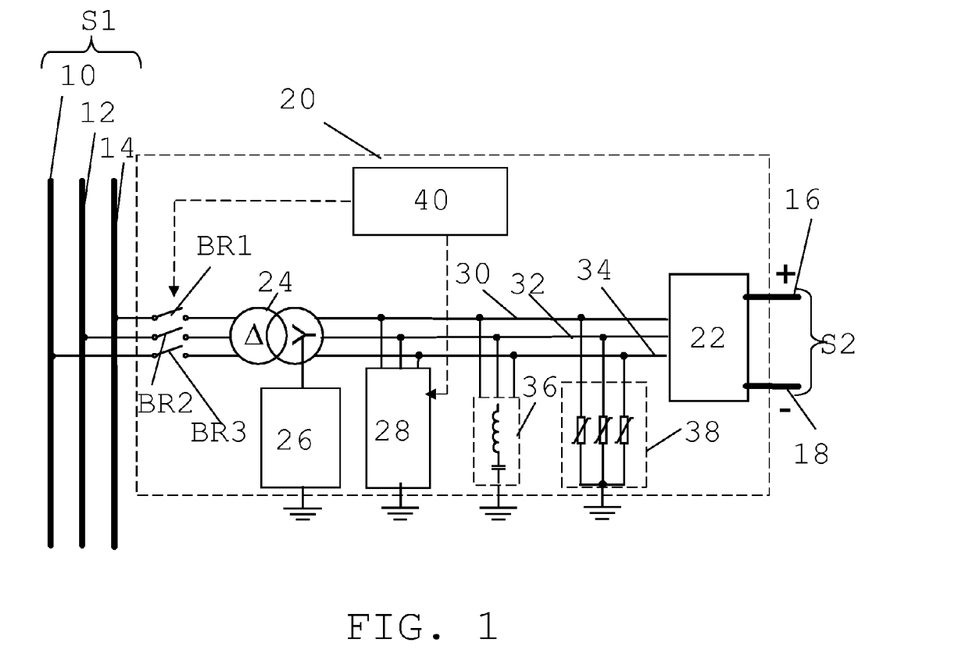

FIG. 1 schematically shows an interface arrangement 20 according to a first embodiment of the invention for connection between an AC system S1 and a DC system S2. The AC system S1 is in this embodiment a three-phase AC system and includes three conductors 10, 12 and 14 to which the DC system S2 is connected. The DC system S2 in turn includes two poles 16 and 18 that are coupled to the AC system conductors 10, 12 and 14 via the arrangement 20. In this embodiment there are two poles 16 and 18 and therefore the DC system is a bipole system. It should however be realized that the invention can also be used with a monopole system. It should here furthermore be realized that both the DC and AC system could include a lot more elements than the poles and conductors shown. However, these are not central for the understanding of the present invention and have therefore been omitted.

In order to enable the DC system S2 to be coupled to the AC system S1, the arrangement 20 includes a converter 22 for conversion between AC and DC. The converter 22 may function as a rectifier and/or inverter. The converter 20 is typically a voltage source converter and can be of a number of various types, of which some will be described later on.

The converter 22 therefore has a DC side for connection to the DC system S2 and more particularly to at least one pole of the DC system and an AC side for being coupled to the AC system.

In this first embodiment of the invention, the arrangement 20 also includes a transformer 24 having a primary side with a first set of primary windings for being coupled to the AC system S1 and a secondary side with a second set of secondary windings coupled to the AC side of the converter. In this first embodiment, the secondary windings are more particularly connected to a number of parallel intermediate electrical connections 30, 32 and 34 interconnecting the transformer 24 with the converter 22. These intermediate connections are sometimes denoted an AC filter busbar. The intermediate connections may be provided as parallel conductors that may be at least two in number and in this case three. The intermediate connections are thus connected to the converter and lead from this converter towards the AC system. A number of units are connected to these parallel intermediate connections. There is here a surge arrester unit 38, a filter unit 36 and a breaker assisting unit 28, which units are all connected between the parallel intermediate connections 30, 32 and 34 and ground. The filter unit 36 here includes a series connection of inductor and capacitor selected to provide filtering of high frequency components of the voltage appearing on the intermediate connections, for instance frequencies ten times or more higher than the frequency of the AC system, while the surge arrester unit 38 includes three parallel surge arresters, each connected between a corresponding intermediate connection and ground. It should be realized that the surge arrester unit and filter unit are not central to the invention and may therefore be omitted.

In the present example the conductors 10, 12 and 14 of the AC system S1 and the intermediate connections are three and provided for transmissions of three phase AC voltages. For this reason the primary side of the transformer 24 includes three windings, which in this first embodiment are connected in a delta configuration. It should however be realized that it is also possible with a wye configuration. The primary side here lacks neutral point grounding. The primary side furthermore has three parallel connections to the AC system, one provided for each phase. In each of these connections there is a corresponding circuit breaker BR1, BR2 and BR3. The arrangement 20 thus includes a set of circuit breakers, which set according to the first embodiment includes three circuit breakers BR1, BR2 and BR3. As can be seen in FIG. 1, the circuit breakers BR1, BR2 and BR3 of the set are coupled between the AC side of the converter and the AC system S1.

The secondary side of the transformer 24 here has a wye configuration, with the central or neutral point of this connection being coupled to ground via a filter 26. This filter 26 is here provided for filtering away frequency components at three times the fundamental frequency of an AC voltage appearing on the AC side of the converter and here also on the intermediate connections. This fundamental frequency is in this case the same as the frequency used in the AC system S1. It should however be realized that it may differ and that a frequency conversion unit may be included in the interface arrangement.

Finally there is a first control unit 40 controlling the breaker assisting unit 28 and the circuit breakers BR1, BR2 and BR3. The control is indicated with dashed arrows in FIG. 1.

Figure 2A:
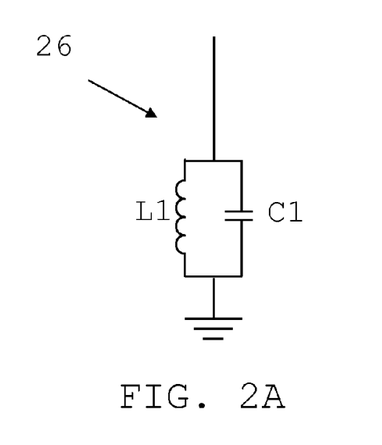
Figure 2B:
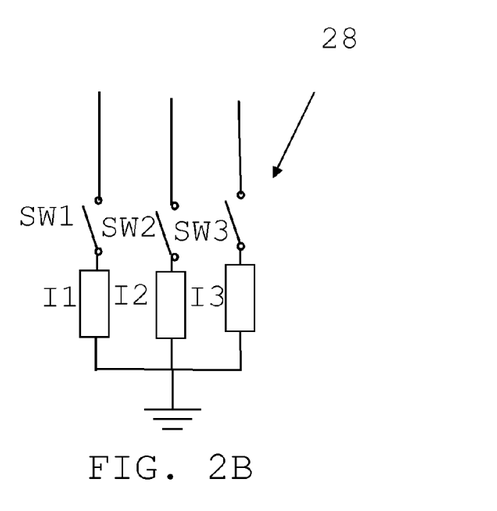

FIG. 2A shows one configuration of the filter 26 and FIG. 2B one configuration of the breaker assisting unit 28. The filter 26 here includes a first inductor L1 in parallel with a first capacitor C1. The values of these elements are selected for providing filtering at three times the fundamental frequency of the voltage on the intermediate connections 30, 32 and 34 i.e. at the fundamental frequency provided at the AC side of the converter. The frequency of this voltage is here also the frequency of the AC system.

The breaker assisting unit 28 in turn includes three parallel branches, where each branch is connected between ground and the AC side of the converter. Each branch includes a series connection of a switch SW1, SW2 and SW3 and an impedance element I1, I2 and I3, respectively. When the switches SW1, SW2 and SW3 are closed, the impedance elements I1, I2 and I3 each provide an impedance between the corresponding intermediate connection and ground. In this first embodiment the impedance elements are reactors and thus the impedance is reactive. However, it should be realized that they may be resistive instead and also in some variations of the invention capacitive.

Figure 3:
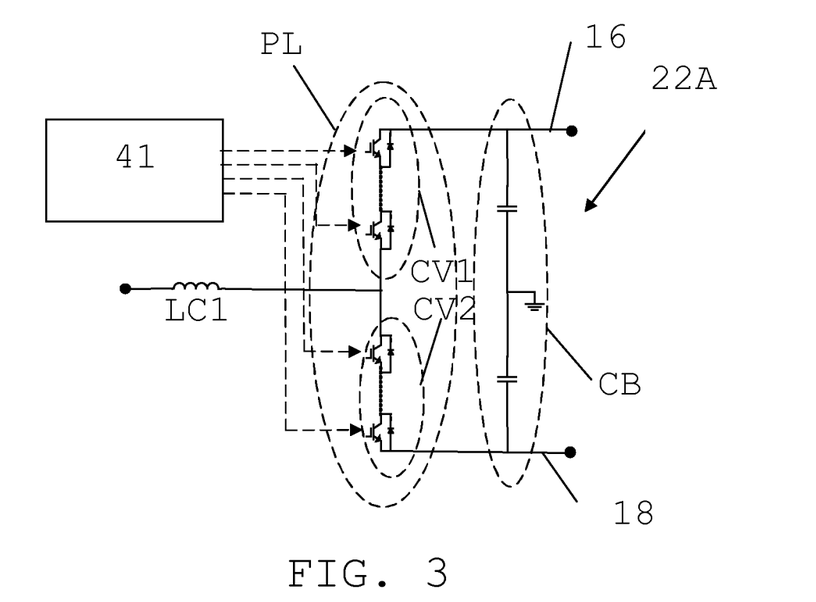
Figure 4:
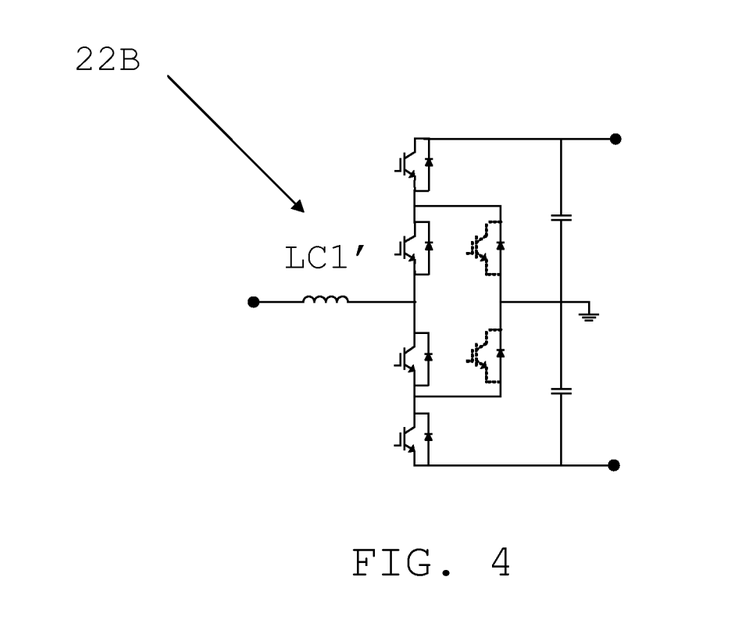
Figure 5:
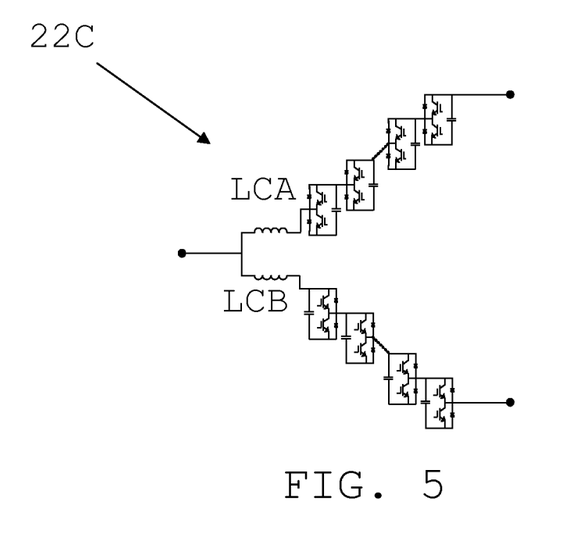
Figure 6:
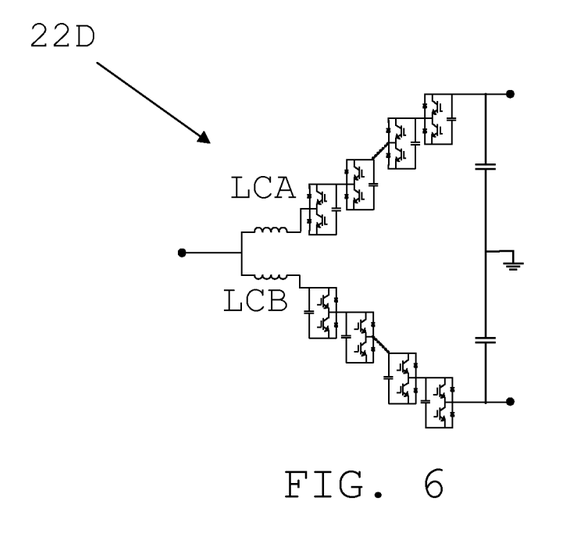
Figure 7:
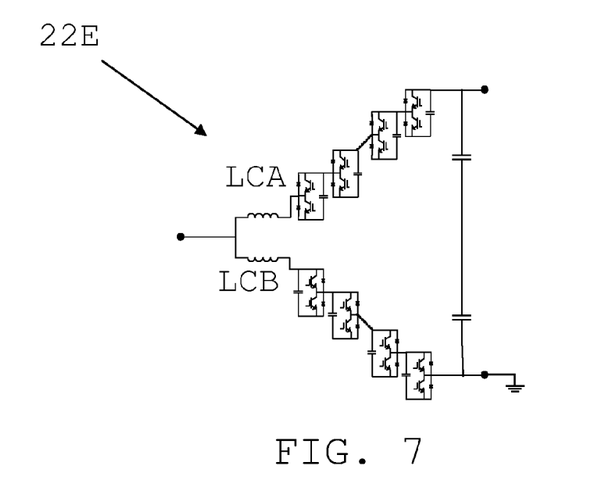

As mentioned earlier, the converter 22 is with advantage a voltage source converter and may as such be of a number of different types. It may for instance be a two-level a three-level or a multi-level converter, where a two-level converter 22A is schematically shown in FIG. 3, a three-level converter 22B is schematically shown in FIG. 4, a first variation of a multi-level converter 22C is schematically shown in FIG. 5, a second variation of a multilevel converter 22D is schematically shown in FIG. 6 and a third variation of multilevel converter 22E is schematically shown in FIG. 7. Each such converter normally includes a number of phase legs, where there is one phase leg for each phase provided via the intermediate connections. A converter thus includes at least two and in this case three phase legs. However, in FIGS. 3-7, only one such phase leg is shown.

As can be seen in FIG. 3 depicting the two-level converter 22A, a phase leg PL of this converter includes a number of series connected switching elements provided in the form of a transistor with anti-parallel diode. The switching elements are connected in series between the two poles 16 and 18. In parallel with the phase leg PL there is a capacitor bank CB (here shown including two capacitors). The midpoint of this capacitor bank CB is grounded while the mid point of the phase leg PL is connected to a first end of a phase reactor LC1 having a phase inductance, the second end of which is connected to a corresponding intermediate connection of the arrangement. The switching elements between the phase leg mid point and a pole here together make up a converter valve. There are thus two converter valves CV1 and CV2 in FIG. 3. The phase reactor here forms a pole to AC side inductance of the converter for both poles.

As mentioned earlier there can be further parallel phase legs connected between the poles, one for each intermediate connection. Therefore a converter includes a set of pole to AC side inductances, which set of pole to AC side inductances are provided through the inductances of the phase reactors in the phase legs.

In operation the switching elements are controlled, typically by a second control unit 41, for instance using pulse width modulation (PWM), for obtaining an AC voltage at the second end of the phase reactor LC1 having the same frequency as the AC system. This is normally done through the phase leg midpoint alternately being placed at the potential or voltage of the positive and negative poles. These two voltages thereby form the two levels of the converter. The control is indicated through dashed arrows in FIG. 3.

The three-level converter 22B in FIG. 4 resembles the two-level converter and in this example includes a phase leg with a first branch including four switching elements connected in series. The difference between the three- and the two-level converter is that there is a further branch of switching elements, here including two switching elements, connected in parallel with the two switching elements of the first branch provided adjacent and on opposite sides of the phase leg midpoint. The midpoint of this further branch is furthermore grounded. The switching elements are here controlled by the second control unit (not shown), typically also using PWM, so that the phase leg midpoint obtains three levels, a positive pole potential, a zero potential and a negative pole potential, which makes up the three levels of the three-level converter.

The first variation of a multilevel converter 22C shown in FIG. 5 does have a slightly different configuration. There is no capacitor bank. Instead each phase leg is made up of a series connection of cells, where each cell is made up of two series connected switching elements having a capacitor connected in parallel with both these elements. In this example the midpoint between two switching elements of a cell is connected to one end of the capacitor of a following cell. In this way the cells are connected in series between the two poles. In the phase leg, on opposite sides of the phase leg midpoint there are furthermore provided first and second reactors LCA and LCB. In this type of converter the phase reactor is provided through these two reactors LA and LB provided in separate phase leg halves on opposite sides of the phase leg midpoint. Each of these reactors here forms a pole to AC side inductance for a corresponding pole. The multilevel converter according to this first variation is furthermore a symmetrical monopole converter.

Each cell here provides a zero or a small voltage contribution. The switching elements of the cells are furthermore controlled by the second control unit (not shown) so that the voltage at the phase leg midpoint resembles a reference AC voltage. This means that the cells are switched for providing a zero or the small voltage contribution, where the sum of the small voltage contributions of the cells together form an AC voltage resembling the reference AC voltage.

The operation of these types of converters is as such not new and known in the art. They can furthermore be varied in a multitude of ways. It is for instance possible to provide midpoint grounding, i.e. grounding for a midpoint between the two poles, also in the multi-level converter. This is shown in FIG. 6, where the second variation of the multilevel converter 22D is shown in the form a bipole multilevel converter. This differs from the converter in FIG. 5 through a capacitor bank being placed between the two poles, where the midpoint of this capacitor bank is grounded. It is also possible to provide an unsymmetrical monopole multilevel converter, which is shown in FIG. 7. This third variation of a multilevel converter 22E differs from the second variation through one pole being grounded instead of the capacitor bank midpoint. It is also possible to omit midpoint grounding of the two- and three-level converters, ground one pole of them as well as provide them as unsymmetrical monopole converters.

In order to raise the efficiency of the converter it is also possible to add a zero sequence third harmonic to the AC voltage at converter AC side, i.e. to the AC voltage appearing on the intermediate connections. This third harmonic can be injected by the second control unit using PWM, which is often called Third Harmonic Injection Pulse Width Modulation (3PWM). This increases the modulation index with about 15% through reducing the peak level of the voltage, which can be used for increasing the efficiency. However, this type of harmonic cannot be allowed to reach the AC system S1, where such harmonic is not used. This means that the zero sequence harmonic has to be removed.

A first aspect of the invention concerns the combined use of the circuit breakers, breaker assisting unit and control unit.

This first aspect will now be described in relation to FIG. 1, 2B and 6, where the latter shows a flowchart of a number of method steps being performed in the control unit.

It can first be mentioned that the size of the impedance elements I1, I2 and I3 of the branches are optionally much smaller than the impedances of the corresponding phases in the converter, which phase impedances are in the examples in FIGS. 3-7 made up of the impedances of the phase reactors. This means that a branch impedance element may be much smaller than the pole to AC side impedance, here inductance, being connected to the same intermediate connection. Typically the impedance of an impendence element, in the first embodiment in the form of an inductance of a branch reactor, may have a value that is below 30% of the impedance, in the form of the inductance, between a pole and the intermediate connection for the same phase via the converter, i.e. between a pole and the AC side of the converter. A branch impedance may alternatively have a value that is below 20% of the corresponding pole to AC side impedance.

In normal operation of the systems and interface arrangement, the circuit breakers BR1, BR2 and BR3 are closed while the switches SW1, SW2 and SW3 are open. If a fault occurs in the DC system S2 or in the interface arrangement, this fault could be detected in the DC system S2, in the converter 22, at the intermediate connections or at the transformer and reported to the first control unit 40. Faults that occur may be pole to ground faults, single phase to ground faults, multiple phase to ground faults and phase-to-phase short circuit faults. The faults in relation to which the invention may be used therefore include short-circuit faults, like short circuit faults between phase or phases and ground, between pole and ground and between phases. In this way the first control unit 40 obtains a fault indication, step 42.

Figure 8:
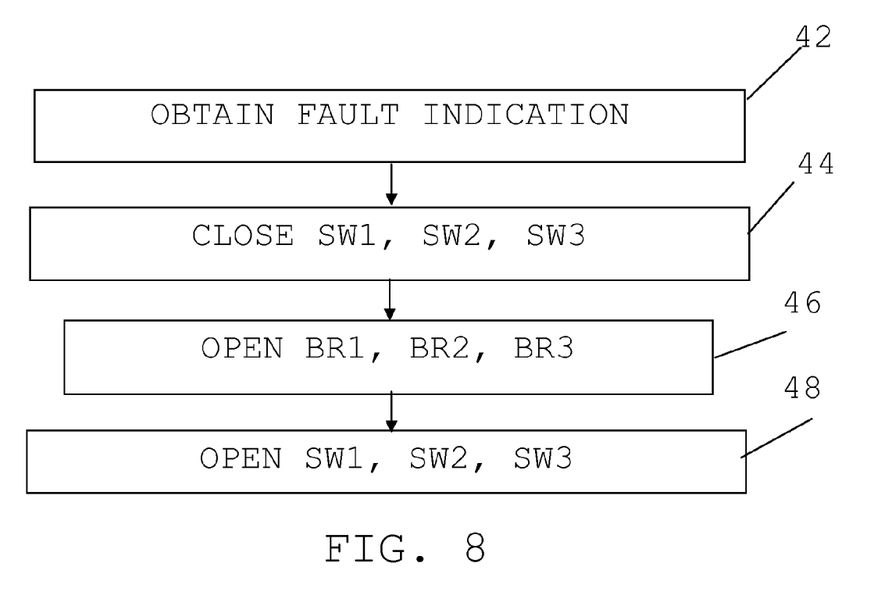
FIG. 8 shows a number of method steps in a method of disconnecting the DC system from the AC system being performed by a control unit in the interface arrangement.

When such a fault occurs it is necessary to disconnect the DC system from the AC system S1. This should be done as soon as possible. However, this disconnection is often not possible to perform directly, because it may be necessary to await a zero-crossing of the fault current. The first control unit 40, when receiving such an indication first controls the switches SW1, SW2 and SW3 of the breaker assisting unit 28 to close and thereby the impedance elements I1, I2 and I3 are connected between the phases of the intermediate connections 30, 32 and 34 and ground, step 44. This switching is done fast and as soon as the indication of a fault is obtained. This fast closing of the switches SW1, SW2 and SW3 is thus based on the indication of a fault. If the branch impedances are much smaller than the impedances of the phase reactors, the short-circuit currents through the diodes of the valves are bypassed via the branch impedances. Thus, the switching elements of the valves are protected with regard to fault current and overvoltage prior to disconnection via the circuit breakers. Because of this a large part of the fault current will be led to ground via the impedance elements I1, I2 and I3.

These short-circuit currents through the diodes are furthermore limited even if the branch impedances are not much smaller. Since all switches SW1, SW2 and SW3 are closed the fault currents in the various phases are furthermore made symmetrical. The same current will also run in all three phases. In the first embodiment the closing of the switches is made immediately, which speeds up the symmetrization. It is also possible that the switches are closed sequentially. The symmetrization of the fault current has another advantage. It guarantees or ensures that the fault current flowing through the circuit breakers BR1, BR2 and BR3 will have zero-crossings, which is not always the case depending on which converter topology is used and which type of fault that occurs. If for instance, a monopole converter as shown in FIG. 7 is combined with a delta connected primary side transformer connection as shown in FIG. 1 without a breaker assisting unit and there occurs a pole to ground fault, then the fault current through the breakers will lack zero-crossings for many cycles, which makes it hard and sometimes even impossible to open the circuit breakers. The same type of problem can also occur when the converter is a symmetrical monopole converter.

When the fault current has a zero-crossing, it is then possible to open the breakers BR1, BR2 and BR3. As the fault currents of the phases are symmetrical, this can be done at the same time in all phases. The first control unit 40 therefore controls the circuit breakers BR1, BR2 and BR3 to be opened, step 46. This circuit breaker opening could be performed after a known time has elapsed after the closing of the switches SW1, SW2 and SW3 or after having measured the current and/or voltage on the intermediate connections and in this way having detected that the current has a zero-crossing. After the opening of the circuit breakers, the first control unit 40 may thereafter open the switches SW1, SW2 and SW3, step 48.

The switches of the breaker assisting unit 28 are thus quickly closed when a fault takes place, such as a pole to ground fault, and the advantages of this is that the converter components are protected until the circuit breakers have been opened for disconnecting the DC system from the AC system. Another advantage is that the fault currents are made symmetrical. This guarantees that the fault current through the circuit breakers caused by a pole to ground fault will have zero-crossings independently of which converter type is used, which simplifies and in some cases also speeds up the time when such a zero-crossing occurs. This also speeds up the time at which circuit breaker opening can be performed.

Now a second aspect of the present invention will be described with reference being made to FIGS. 1 and 2A.

As can be seen in FIG. 1, the neutral point of the secondary side of the transformer 24 is coupled to ground via the filter 26 having its filter elements, here inductor L1 and capacitor C1, set to remove components at three times the fundamental frequency. This means that the filter is set to remove such zero sequence third harmonics in the voltage appearing on the AC side of the converter and the intermediate connections 30, 32 and 34 so that these types of harmonics do not reach the AC system S1. In this embodiment the filter is in fact a resonance circuit providing resonance at this frequency of three times the fundamental frequency of the AC voltage appearing on the intermediate connections. The filter can also be a low pass filter or a band pass filter set to this frequency.

Through the transformer neutral point being coupled to ground via the filter 26 a number of advantages are obtained. The neutral point grounding assists the breaker assisting unit in the limiting of over-voltages at faults. The provision of the filter 26 furthermore enables removal of zero sequence third harmonics despite the neutral point of the transformer secondary side being grounded.

It should here be realized that the first and second aspects of the invention need not be combined. It is possible to provide an interface arrangement only implementing the first aspect. This means that the transformer can have any configuration on the primary and secondary sides. These sides may be delta or wye connected independently of each other and also provided with or without neutral point grounding. In fact it is possible to omit the transformer. The converter may in this type of situation directly convert to the voltage of the AC system. This thus means that the intermediate connections could at one end be connected to the converter and at an opposite end to the circuit breakers which in turn are connected to the AC system.

The phase inductance of a converter between a pole an intermediate connection may be provided through one or two phase reactors as shown in FIGS. 3-7. It should however also be realized that in a multilevel converter the phase inductance could be placed at another location between the pole and AC side of the converter or distributed through several small inductors, for instance one in each cell or through inductors connected between the cells.

The first and second control units may each be provided as a computer or a processor with computer program memory including computer program code instructions causing the processor to perform the method of the invention when being run. The computer program instructions can also be provided on a data carrier, such as a CD Rom disk or a memory stick and loaded onto a computer. The program code can also be provided in a server and loaded onto a computer remotely.

From the foregoing description of different variations of the present invention, it should be realized that it is only to be limited by the following claims.

The invention claimed is:

1. An interface arrangement for connection between an AC system and a DC system and comprising:
    a voltage source converter for conversion between AC and DC, said converter having a DC side for connection to said DC system and an AC side for being coupled to said AC system;
    a set of circuit breakers coupled between the AC side of the converter and the AC system; and
    a breaker assisting unit comprising a set of branches connected between the AC side of the converter and ground, where each branch includes a switch in series with an impedance element,
    wherein the circuit breakers are closed and the switches are open in normal operation, and
    the interface arrangement further comprises a control unit configured to close the switches of the branches upon the occurrence of a fault for ensuring zero-crossings in currents flowing through the circuit breakers and to open the circuit breakers at such zero-crossings.

2. The arrangement according to claim 1, wherein the converter has a set of pole to AC side inductances and the impedances of the impedance elements of the branches have values that are less than 30% of the pole to AC side inductances.

3. The arrangement according to claim 2, wherein the impedances of the impedance elements are less than 20% of the pole to AC side inductances.

4. The arrangement according to claim 1, wherein the control unit is configured to close the switches immediately upon the occurrence of the fault.

5. The arrangement according to claim 1, wherein the control unit is configured to open the switches after the circuit breakers have been opened.

6. The arrangement according to claim 1, further comprising a transformer having a primary side with a first set of primary windings for being connected to said set of circuit breakers and a secondary side with a second set of secondary windings coupled to said AC side of the converter, said second set of secondary windings being coupled to ground via a neutral point of said secondary side.

7. The arrangement according to claim 6, wherein the windings in the second set of windings are connected in a wye configuration.

8. The arrangement according to claim 6, further comprising a filter with filter elements being set for removing a frequency component at three times the fundamental frequency of an AC voltage appearing at the AC side of the converter and where said filter is connected between the neutral point of the secondary side of the transformer and ground.

9. The arrangement according to claim 8, wherein the converter is configured to inject said frequency component at three times the fundamental frequency in the conversion.

10. The arrangement according to claim 8, wherein the filter is formed through a resonance circuit set to resonate at three times the fundamental frequency of the AC voltage at the AC side of the converter.

11. The arrangement according to claim 8, wherein the windings in the first set of primary windings lack coupling to ground.

12. A method of disconnecting a DC system from an AC system, said DC system being coupled to the AC system via a voltage source converter for conversion between AC and DC and a set of circuit breakers and to ground via a breaker assisting unit comprising a set of branches, where each branch includes a switch in series with an impedance element, and the circuit breakers are closed and the switches are open in normal operation, the method comprising the steps of:
  obtaining an indication of a fault;
  closing the switches of the branches based on said indication for ensuring zero-crossings in currents flowing through the circuit breakers; and
  opening the circuit breakers at such zero-crossings.

13. The method according to claim 12, wherein the step of closing the switches comprises closing the switches immediately.

14. The method according to claim 12, further comprising the step of opening the switches after the circuit breakers have been opened.

15. The arrangement according to claim 2, wherein the control unit is configured to close the switches immediately upon the occurrence of the fault.

16. The arrangement according to claim 3, wherein the control unit is configured to close the switches immediately upon the occurrence of the fault.

17. The arrangement according to claim 2, wherein the control unit is configured to open the switches after the circuit breakers have been opened.

18. The arrangement according to claim 3, wherein the control unit is configured to open the switches after the circuit breakers have been opened.

19. The arrangement according to claim 7, further comprising a filter with filter elements being set for removing a frequency component at three times the fundamental frequency of an AC voltage appearing at the AC side of the converter and where said filter is connected between the neutral point of the secondary side of the transformer and ground.

20. The arrangement according to claim 9, wherein the filter is formed through a resonance circuit set to resonate at three times the fundamental frequency of the AC voltage at the AC side of the converter.

* * * * *